(12) United States Patent
Beichter et al.

(10) Patent No.: US 7,826,386 B2
(45) Date of Patent: Nov. 2, 2010

(54) FACILITATING THE CONFIGURING OF COMMUNICATIONS ENVIRONMENTS

(75) Inventors: Friedrich W. Beichter, Altbach (DE); John J. Hughes, Damascus, MD (US); Ravi Ranjan, Poughkeepsie, NY (US); Charles E. Shapley, Salt Point, NY (US); James R. Urquhart, Fishkill, NY (US); Brian K. Zerba, Mount Marion, NY (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 10/730,664

(22) Filed: Dec. 8, 2003

(65) Prior Publication Data

US 2005/0122911 A1    Jun. 9, 2005

(51) Int. Cl.
*H04J 1/16* (2006.01)
*H04L 12/26* (2006.01)

(52) U.S. Cl. ..................................... 370/252
(58) Field of Classification Search ....................... None
See application file for complete search history.

(56) References Cited

U.S. PATENT DOCUMENTS

| | | | |
|---|---|---|---|
| 3,693,161 A | 9/1972 | Price et al. | |
| 4,207,609 A | 6/1980 | Luiz et al. | |
| 4,564,903 A | 1/1986 | Guyette et al. | |
| 4,754,397 A * | 6/1988 | Varaiya et al. | 361/679.39 |
| 4,843,541 A | 6/1989 | Bean et al. | |
| 5,170,472 A | 12/1992 | Cwiakala et al. | |
| 5,185,736 A | 2/1993 | Tyrrell et al. | |
| 5,220,654 A | 6/1993 | Benson et al. | 395/275 |
| 5,297,262 A | 3/1994 | Cox et al. | |
| 5,317,739 A | 5/1994 | Elko et al. | |
| 5,415,851 A | 5/1995 | Kimura et al. | |
| 5,423,026 A | 6/1995 | Cook et al. | 395/575 |
| 5,452,455 A | 9/1995 | Brown et al. | |

(Continued)

FOREIGN PATENT DOCUMENTS

EP    096937 A1    1/2000

(Continued)

OTHER PUBLICATIONS

"Technique For Resetting A Single Channel Path Under Operator Control In IBM System/370XA," IBM Technical Disclosure Bulletin, vol. 26, No. 10B Mar. 1984, p. 5516.

(Continued)

*Primary Examiner*—Raj Jain
(74) *Attorney, Agent, or Firm*—Steven Chiu, Esq.; Blanche E. Schiller, Esq.; Heslin, Rothenberg, Farley & Mesiti P.C.

(57) ABSTRACT

Configuring of a communications environment is facilitated. A mapping tool is provided that aids in the configuring of various components of a communications environment, such as an input/output (I/O) subsystem of the environment. Data generated from an order process and a logical configuration definition are used as input to the mapping tool. The tool performs mapping and generates as output a physical configuration definition, and optionally, one or more reports. The mapping tool has a manual function, as well as an automatic function.

20 Claims, 9 Drawing Sheets

U.S. PATENT DOCUMENTS

| | | | |
|---|---|---|---|
| 5,465,355 A | 11/1995 | Cook et al. | 395/200.15 |
| 5,526,484 A | 6/1996 | Casper et al. | |
| 5,537,574 A | 7/1996 | Elko et al. | |
| 5,548,791 A | 8/1996 | Casper et al. | 395/858 |
| 5,564,040 A | 10/1996 | Kubala | |
| 5,568,648 A | 10/1996 | Coscarella et al. | 395/862 |
| 5,584,039 A | 12/1996 | Johnson et al. | |
| 5,600,805 A | 2/1997 | Fredericks et al. | |
| 5,640,603 A | 6/1997 | Meritt et al. | |
| 5,644,712 A | 7/1997 | Coscarella et al. | 395/200.01 |
| 5,664,219 A | 9/1997 | Glassen et al. | 395/825 |
| 5,671,441 A | 9/1997 | Glassen et al. | 395/828 |
| 5,680,580 A | 10/1997 | Beardsley et al. | |
| 5,793,983 A | 8/1998 | Albert et al. | |
| 5,845,146 A | 12/1998 | Onodera | |
| 5,907,684 A | 5/1999 | Halma et al. | |
| 5,996,026 A | 11/1999 | Onodera et al. | |
| 6,125,411 A | 9/2000 | Sato | |
| 6,195,330 B1 | 2/2001 | Sawey et al. | |
| 6,240,467 B1 | 5/2001 | Beardsley et al. | |
| 6,266,325 B1 | 7/2001 | Ishioka et al. | 370/248 |
| 6,397,260 B1 | 5/2002 | Wils et al. | |
| 6,763,454 B2 * | 7/2004 | Wilson et al. | 713/1 |
| 6,842,789 B1 * | 1/2005 | Nazari | 709/245 |
| 7,085,860 B2 | 8/2006 | Dugan et al. | |
| 7,130,938 B2 | 10/2006 | Brice, Jr. et al. | |
| 7,133,907 B2 * | 11/2006 | Carlson et al. | 709/220 |
| 7,177,920 B1 * | 2/2007 | Brown, Jr. | 709/220 |
| 7,290,070 B2 | 10/2007 | Brice, Jr. et al. | |
| 7,394,760 B1 * | 7/2008 | Nucci et al. | 370/225 |
| 7,512,133 B2 | 3/2009 | Dugan et al. | |
| 2004/0083356 A1 | 4/2004 | Chatterjee et al. | |

FOREIGN PATENT DOCUMENTS

| | | |
|---|---|---|
| EP | 0969371 A1 * | 5/2000 |
| JP | 11136254 | 5/1999 |

OTHER PUBLICATIONS

"Multiple-Processor Origin Mapping In Buffered Subsystem," IBM Technical Disclosure Bulletin, vol. 25, No. 5, Oct. 1982, pp. 2492-2494.

"Multiple Logical Input/Output Subsystem Facility," Brice et al., U.S. Appl. No. 10/436,021, filed May 12, 2003.

"Method, System and Program Products For Identifying Communications Adapters Of A Computing Environment," Brice et al., U.S. Appl. No. 10/436,385, filed May 12, 2003.

"zSeries 990 CHPID Mapping Tool User's Guide," IBM Publication No. G28-6825-00 (Jun. 2003).

"IBM CHPID Mapping Tool—Standalone Version," IBM Corporation, Sep. 2002.

"z/Architecture Principles of Operation," Publication No. SA22-7832-01, Oct. 2001.

"z/Os Hardware Configuration Definition User's Guide," Publication No. SC33-7988-03, May 2003.

"zSeries Input/Output Configuration Program User's Guide for ICP IOCP," IBM Publication No. SB10-7037-00, First Edition, Jun. 2003.

Office Action for U.S. Appl. No. 10/436,385 dated Nov. 16, 2004.

Final Office Action for U.S. Appl. No. 10/436,385 dated Apr. 15, 2005.

Office Action for U.S. Appl. No. 10/436,385 dated Nov. 1, 2005.

z/Series—Input/Output Configuration Program User's Guide for ITP IOCP, SB10-7029-03; International Business Machines, Fourth Edition, Aug. 2002, Chapter 2.

* cited by examiner

FACILITATING THE CONFIGURING OF COMMUNICATIONS ENVIRONMENTS

TECHNICAL FIELD

This invention relates, in general, to managing communications environments, and in particular, to facilitating the configuring of a communications environment.

BACKGROUND OF THE INVENTION

The configuring of a communications environment is typically a complex and tedious task, especially for large or involved environments. For example, to configure an input/output (I/O) subsystem of a communications environment, in which the I/O subsystem has hundreds or even thousands of communications adapters, takes a great deal of effort and is error prone.

Adding to the complexity of configuring is a desire to minimize the loss of connectivity to data. That is, in many instances, it is desirous to avoid single points of failure or single points of repair, in which the loss of a resource causes the loss of connectivity to certain data.

Although some strides have been made in facilitating the configuring of communications environments, further enhancements are needed. For example, a need exists for a capability that enables the automatic mapping of physical identifiers of resources in an environment to logical identifiers of the resources.

SUMMARY OF THE INVENTION

The shortcomings of the prior art are overcome and additional advantages are provided through the provision of a method of facilitating configuring of resources of a communications environment. The method includes, for instance, automatically mapping a first identifier of a resource of a communications environment to a second identifier of the resource, wherein the first identifier is usable by hardware to identify the resource and the second identifier is usable by a program of the communications environment to identify the resource.

In a further aspect of the present invention, a mapping tool is provided. The mapping tool includes, for instance, a first input including one or more physical definitions, the one or more physical definitions including one or more physical identifiers of one or more resources of a communications environment; a second input including one or more logical definitions, the one or more logical definitions including one or more logical identifiers of one or more resources of the communications environment; and mapping logic to map a physical identifier of the one or more physical identifiers to a logical identifier of the one or more logical identifiers, wherein the physical identifier is used by hardware of the communications environment to identify a resource associated with the physical identifier and the logical identifier is used by a program of the communications environment to identify the resource.

System and computer program products are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for facilitating the configuring of communications environments. In one example, a mapping tool is employed to aid in the configuring. The configuring can be of many different resources; however, in the embodiment described herein, the configuring is of an input/output (I/O) configuration of the communications environment.

Figure 1:
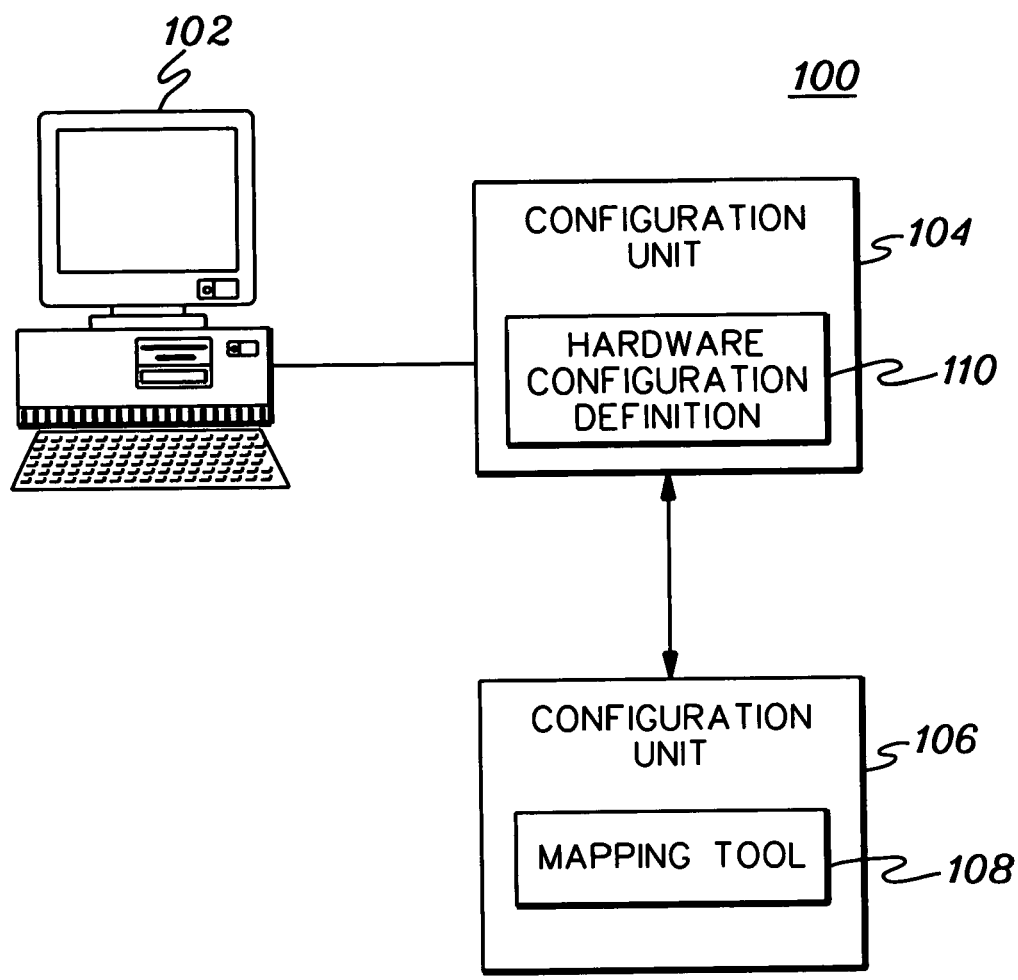
FIG. 1 depicts one embodiment of a configuration environment incorporating and using one or more aspects of the present invention.

One embodiment of a configuration environment incorporating and using one or more aspects of the present invention is described with reference to FIG. 1. A configuration environment 100 is used to facilitate the configuring of one or more communications environments. The environments to be configured are varied and include, for instance, computing units having or being coupled to input/output (I/O) subsystems. In one particular example, a communications environment based on the z/Architecture and including a multiple channel subsystem (MCSS) facility offered by International Business Machines Corporation, Armonk, N.Y., is configured.

Configuration environment 100 includes, for instance, a user unit 102 in communication with a configuration unit 104, which is further coupled (via, for instance, a local area network (LAN)) to another configuration unit 106 executing a mapping tool 108. User unit 102 provides input to configuration unit 104, and includes, for instance, a user terminal, a workstation, etc. Configuration unit 104 is, for instance, a mainframe based on the z/Architecture offered by International Business Machines Corporation, Armonk, N.Y., and includes, for instance, an operating system, such as the z/OS operating system or z/VM operating system, offered by International Business Machines Corporation. Further, in one example, configuration unit 104 executes a hardware configuration definition (HCD), which is used to provide data to and receive data from the mapping tool and to aid in configuring, as described in further detail below. HCD is provided as part of the z/OS or z/VM operating system, and is described in, for instance, an IBM publication entitled "z/OS Hardware Configuration Definition User's Guide," Publication Number SC33-7988-03, May 2003, which is hereby incorporated herein by reference in its entirety.

Configuration unit 106 is, for instance, a workstation, such as a ThinkPad notebook offered by International Business Machines Corporation, a desktop computer or other unit, which is capable of executing mapping tool 108. One example of the mapping tool is described below, and in "zSeries 990 CHPID Mapping Tool User's Guide," IBM Publication No. G28-6825-00 (June 2003), which is hereby incorporated herein by reference in its entirety. The mapping tool includes logic used to facilitate the configuring of a communications environment. In one example, the mapping tool is used to configure an I/O configuration. For instance, it is used to map physical identifiers of I/O resources to logical identifiers of those resources. Although many resources may be mapped, in the example provided herein, communications adapters, such as channels, are mapped. For example, physical channel identifiers (PCHIDs) are mapped to logical channel identifiers (CHPIDs).

A PCHID is, for instance, a 16 bit value that is assigned to a physical channel and used by the hardware of a machine to identify a specific channel. The manner in which the hardware identifies a channel is independent of the way it is identified by software. The software (e.g., operating system) does not use the PCHID, but instead, uses a CHPID mapped to the PCHID. This enables one physical location to be represented by different values. PCHIDs are further described in U.S. patent application "Multiple Logical Input/Output Subsystem Facility," Brice et al., Ser. No. 10/436,021, filed May 12, 2003, and in U.S. patent application "Method, System And Program Products For Identifying Communications Adapters Of A Computing Environment," Brice et al., Ser. No. 10/436,385, filed May 12, 2003, each of which is hereby incorporated herein by reference in its entirety.

Figure 2:
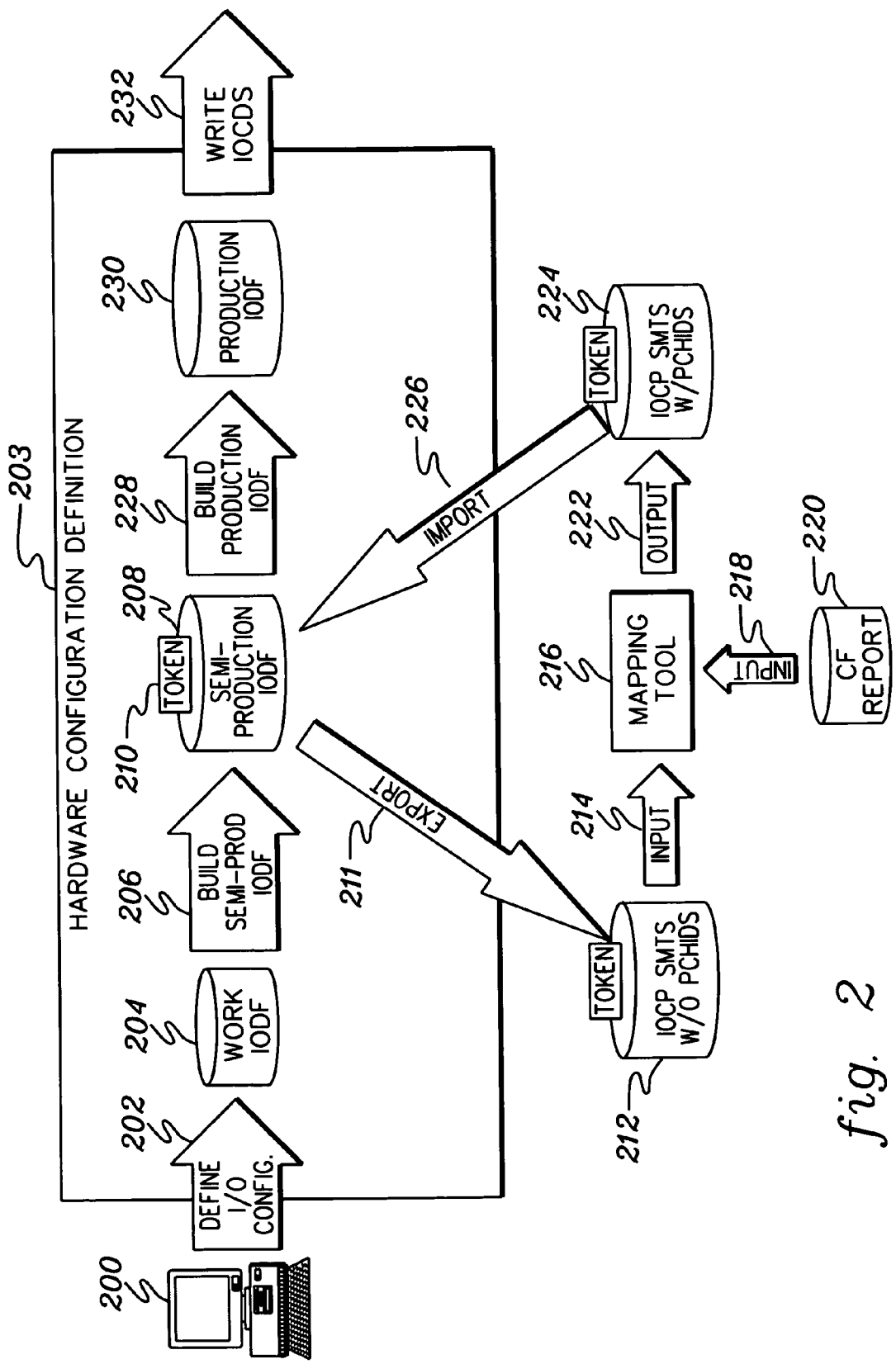
FIG. 2 depicts details related to the relationships between various components of the configuration environment of FIG. 1, in accordance with an aspect of the present invention.

Further details regarding the interaction between the various components of configuration environment 100 and an overview of the mapping capability are described with reference to FIG. 2. A user at user unit 200 provides one or more user definitions 202 to a hardware configuration definition 203. In one example, the one or more user definitions include one or more of the following logical definitions: one or more channel path definitions (including CHPIDs) that indicate the number and type of channels and may or may not include PCHID values; one or more control unit definitions defining the control units associated with the CHPIDs; and/or one or more device definitions. The definitions are validated for correctness based on defined configuration rules (e.g., size of values, etc.), and stored in a work input/output definition file (IODF) 204.

The work I/O definition file includes information for one or more processors and is structured as a set of records organized into trees that are anchored off of an IODF header record (IHR). The trees are, for instance, balanced binary trees with offsets in each record to realize the chaining possibilities for the left and right subtrees. This enables a fast search and add and delete operations to the data. Further details regarding an IODF are described in U.S. patent "Method And System For Managing An Operating System Definition Of A Dynamically Modifiable I/O Configuration," U.S. Pat. No. 5,220,654, issued on Jun. 15, 1993, which is hereby incorporated herein by reference in its entirety.

Using the work IODF, the hardware configuration definition builds 206 a semi-production IODF 208. The semi-production IODF is based on the format of a work IODF. While building the semi-production IODF, the I/O configuration is validated according to defined I/O configuration rules except that missing PCHID values are tolerated. The semi-production IODF is not considered a production IODF, since it does not necessarily include the PCHIDs. When the configuration is validated, a status of "Validated Work IODF" is set in the IHR record. This status is reset with a change in the IODF. For each processor configuration, a world-wide unique token 210 is stored in a processor record (PRP) of the IODF. It is used to ensure that during the process of assigning PCHID values, the contents of the IODF are not changed.

From the semi-production IODF, the I/O configuration is exported 211 to the workstation executing the mapping tool. The export function is used to generate one or more input/output configuration program (IOCP) statements. In one example, the IOCP statements include one or more CHPID statements, in which one or more of the statements may have missing PCHID information; one or more control unit (CNTLUNIT) statements and/or one or more I/O device (IODEVICE) statements. Various techniques, such as File Transfer Protocol (FTP), or Personal Communications (PCom) offered by International Business Machines Corporation can be used for the exporting. In response to the exporting, token 210 is written to the IOCP deck.

The exported IOCP statements with missing PCHIDs 212 is taken as input 214 to a mapping tool 216. The I/O configuration token is passed with the IOCP statements. Also input 218 to mapping tool 216 is a CFReport 220. The CFReport is an output of an order process for a machine of the communications environment. The report includes a binary file that represents the physical description of the final machine to be ordered. In one example, the report is a byproduct of a customer conferring with an account team and describing the type of desired machine (e.g., the model, number of channels of particular kinds, etc.). Together the customer and account team determine the I/O configuration, memory, number of processors, etc. The CFReport is the report sent to manufacturing to be used as a guide to build the machine.

The report is built using, for instance, e.config tool and includes various components. One of the components of the report is the type and physical location, including the physical channel identifier value assigned to that location, of the I/O features to be provided in the machine. It details where each channel is going to be plugged into the machine, as well as other information.

The mapping tool takes the IOCP statements and CFReport as input and outputs 222 IOCP statements 224, which include the original I/O definitions together with a PCHID value assigned to each external logic CHPID value. The original I/O configuration token is still included in the generated statements.

In one example, IOCP statements 224 are then imported 226, via, for instance, FTP or PCom, into semi-production IODF 208. The import function is used to accept the output of the mapping tool and to feed the semi-production IODF with the needed PCHID information to allow the IODF to become a production IODF. The import is, in one embodiment, selective in that only certain information (e.g., PCHIDs) is imported. The hardware configuration definition verifies that the token passed with the IOCP statements matches the token stored in the IODF and whether the status of the work IODF is still "Validated Work IODF." If so, and if the logical I/O definition described by the imported IOCP statements does not differ from the IODF data, the hardware configuration definition builds 228 a production IODF by writing the PCHID values into the IODF. In one example, the PCHIDs are written into the channel path records (CPRs) of the IODF. If any of the checks fail, the import is rejected.

In the production IODF, the format is similar to that of the work IODF, but the data is additionally ordered in such a way that it allows a blocked sequential access to some of the records collected in a specific section (e.g., operating system device information, Generic definition table, and Allocation definition tables) with a high performance without the need to use the built in chaining possibilities. The I/O configuration in a production IODF is validated according the I/O configuration rules and includes the token for each processor configuration stored in the processor record (PRR). This token is changed whenever a production IODF is built from a work IODF and the processor configuration has been changed previously in the work IODF.

The production IODF includes the data used to build an I/O configuration data set (IOCDS) 232. In one example, IOCP builds a configuration definition from the input data statements in the IODF and stores the definition in an IOCDS, which is then ready to be used for the next IML, as an example. Various details regarding IOCP are described in "zSeries Input/Output Configuration Program User's Guide for ICP IOCP," IBM Publication No. SB10-7037-00, First Edition, June 2003, which is hereby incorporated herein by reference in its entirety.

Figure 3:
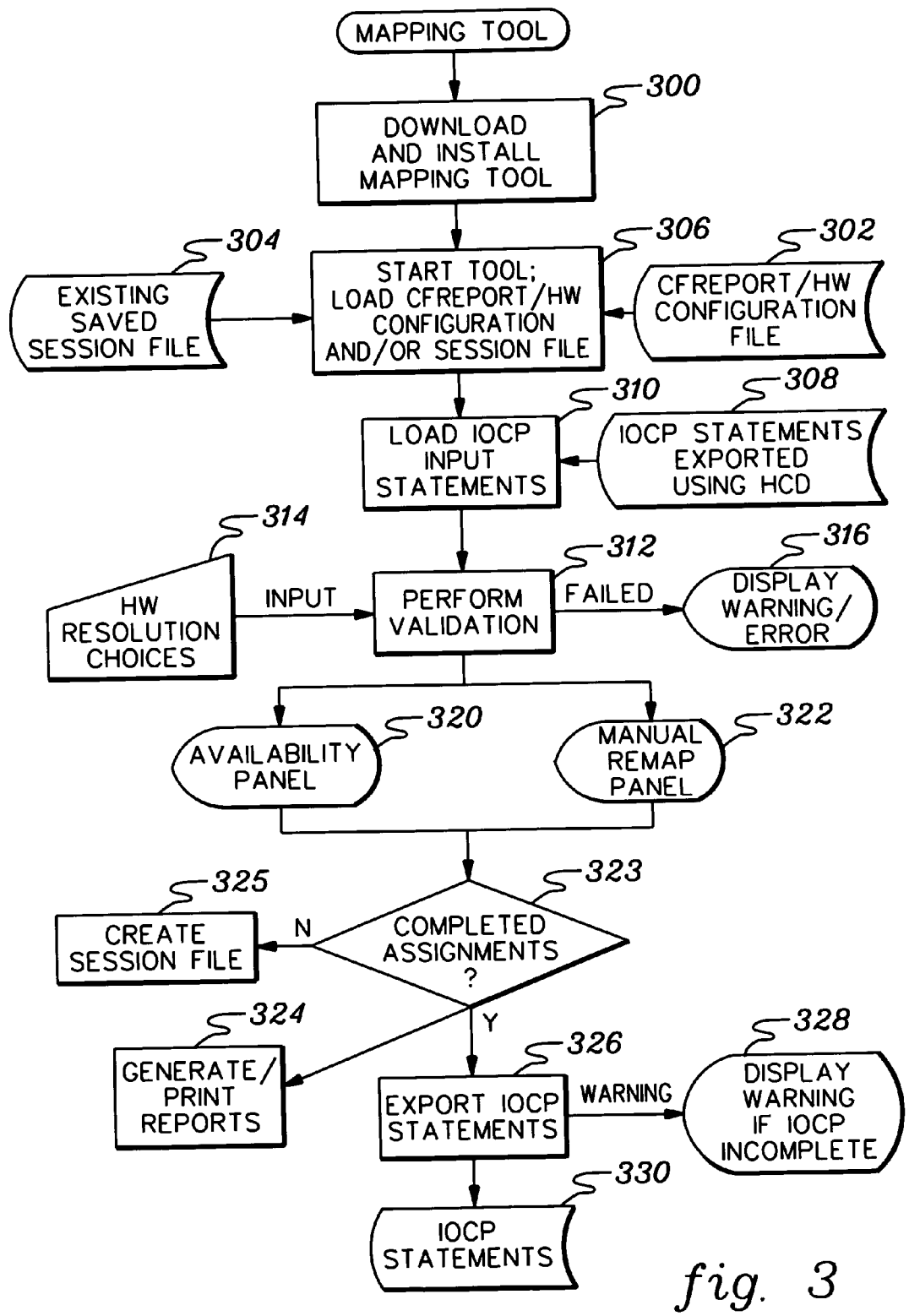
FIG. 3 depicts one embodiment of the logic employed by the mapping tool to configure a communications environment, in accordance with an aspect of the present invention.

One embodiment of the logic associated with the mapping tool is described with reference to FIG. 3. Initially, the mapping tool is downloaded and installed on the workstation. In one example, the tool is downloaded from Resource Links of International Business Machines Corporation. The tool is started and a CFReport or hardware configuration file 302, and/or a session file 304 are loaded, STEP 306. The hardware configuration file is, for instance, a file generated from the CFReport and is an alternate input for the CFReport which is available after the CFReport is sent to manufacturing; and a session file is, for instance, a file that was previously saved for this iteration of the logic and includes definitions that were already built. Additionally, IOCP statements 308 are loaded into the tool, STEP 310. In one example, these IOCP statements are those statements exported using HCD (see 212 of FIG. 2).

Thereafter, one or more validations are performed, STEP 312. One example of a validation includes, for instance, confirming that the logical configuration definition can be accommodated by the proposed machine (CFReport). For instance, if the logical configuration calls for 200 FICON channels, but the ordered machine only has 188 FICON channels, the tool informs the user of the discrepancy and does not continue until the discrepancy is resolved. On the other hand, if the ordered machine is a superset of the logical configuration, the tool informs the user of the discrepancy, but allows the user to continue. By allowing the user to continue, the user can order and install more resources than is immediately needed and defined.

As a further example, another precheck performed by the tool is hardware resolution. Some logical CHPID types may be defined for different physical channels. For instance, a native FICON CHPID can be defined for a long wave or a short wave FICON channel. When there is a mix of these physical hardware types in a configuration, the tool presents the user with these logical definitions and asks from which hardware types to choose 314 the actual physical channel assignment. These validations not only help ensure the proper operation of the tool and that valid output will be generated, but also helps the customer validate that their actual order is complete and will fulfill the planned configuration. If one or more of the validations fails, then a warning and/or an error is displayed, STEP 316.

Validation is not only performed for new orders, but is also performed for incremental orders (known as MES) wherein new channels may be added or existing channels may be moved or removed. Whenever the logical definition cannot be accommodated, the tool informs the user of the discrepancy and does not continue.

The tool provides, in one embodiment, two functions: availability mapping and manual mapping. Availability mapping is an automatic feature that provides added functions over manual mapping and uses more components of the IOCP input. The availability function presents the user with a complete list of the control units in the logical definition. If this is an incremental upgrade (e.g., adding new channels to an installed machine), the user is given the choice of only using the new channels and control units for assignment or resetting the entire configuration. Help screens and secondary windows can be offered to further show the I/O devices that are behind the control units.

With manual mapping, the user is presented with a screen showing the physical channels in the ordered machine and the logical definitions that have already been made. The user can then connect/associate the two, thus associating the physical channel (PCHID) with the logical definition (CHPID). This presentation provides a more user-friendly way of associating logical CHPIDs with physical channels (PCHIDs).

In this embodiment, a physical channel (PCHID) can be associated with only one logical CHPID. Once a logical CHPID is assigned to a physical channel, the same logical CHPID is not shown on the screen as a selection for association with other physical channels. Also, only logical CHPIDs that support the channel type for a given physical channel are presented on the screen.

If CHPID/PCHID associations are made using availability mapping and the user overrides those assignments using manual mapping, the tool warns the user of possible impact to availability assignments generated by the availability mapping function.

The user decides whether to employ availability mapping or manual mapping by selecting the appropriate panel. Availability mapping is selected via an available panel 320 and manual mapping is selected via a manual remap panel 322. The logic associated with availability and manual mapping is described below.

Regardless of which technique is chosen, subsequent to performing the mapping a determination is made as to whether the assignments have been completed, INQUIRY 323. If there are more assignments to be performed, then a session file is created for later use, STEP 325. However, if the assignments are complete, then processing continues.

One or more reports are optionally generated, STEP 324, and the generated IOCP statements are exported 326 from the tool. If the IOCP statements are incomplete, then a warning 328 is generated. Otherwise, the final IOCP statements 330 are stored. These IOCP statements are those with the PCHIDs, which now can be imported back into the hardware configuration definition (see FIG. 2) to be used to build a production IODF and eventually to write the IOCDS.

Figure 4:
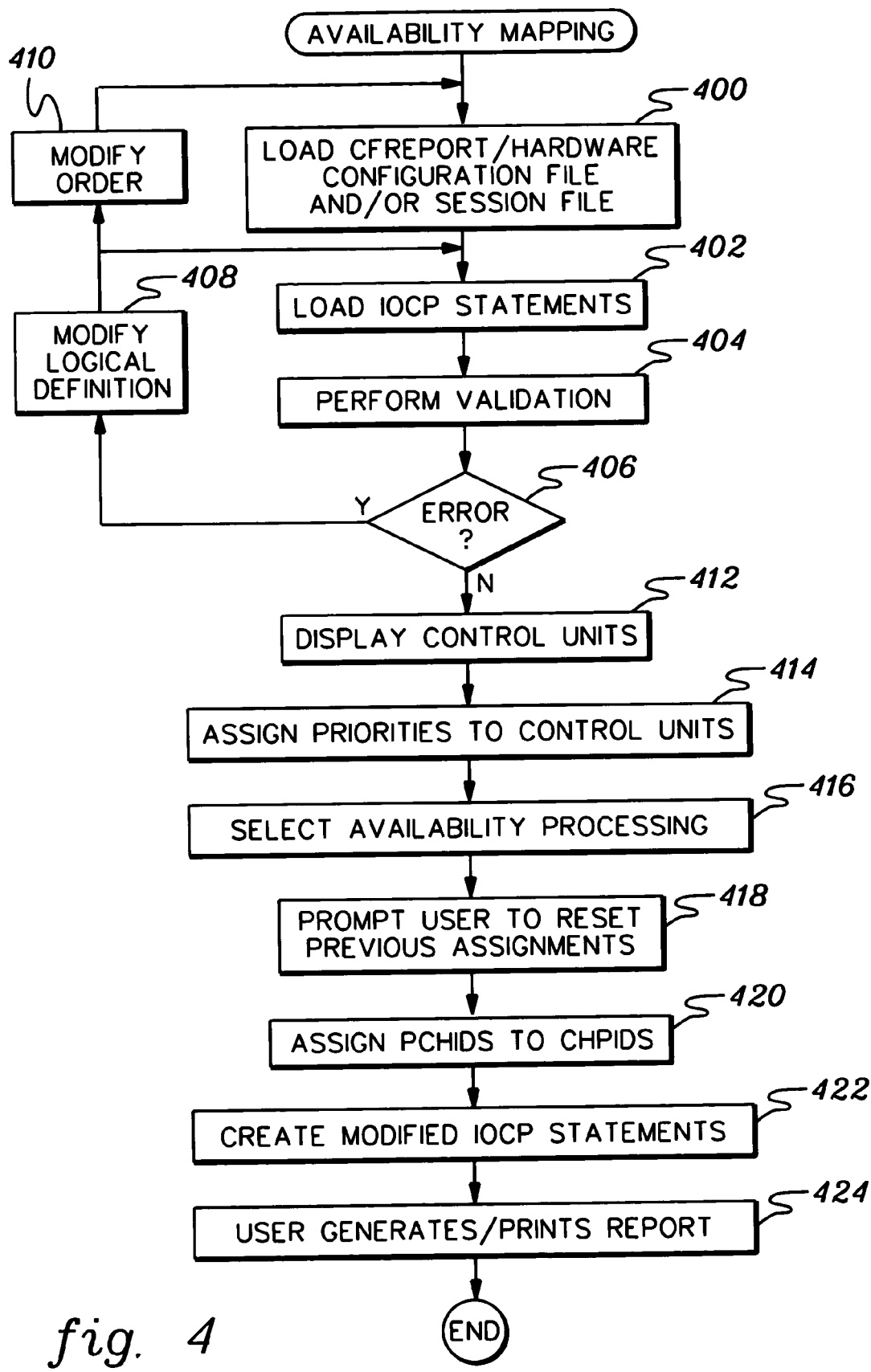
FIG. 4 depicts one embodiment of the logic associated with availability mapping offered with the mapping tool, in accordance with an aspect of the present invention.
Figure 5:
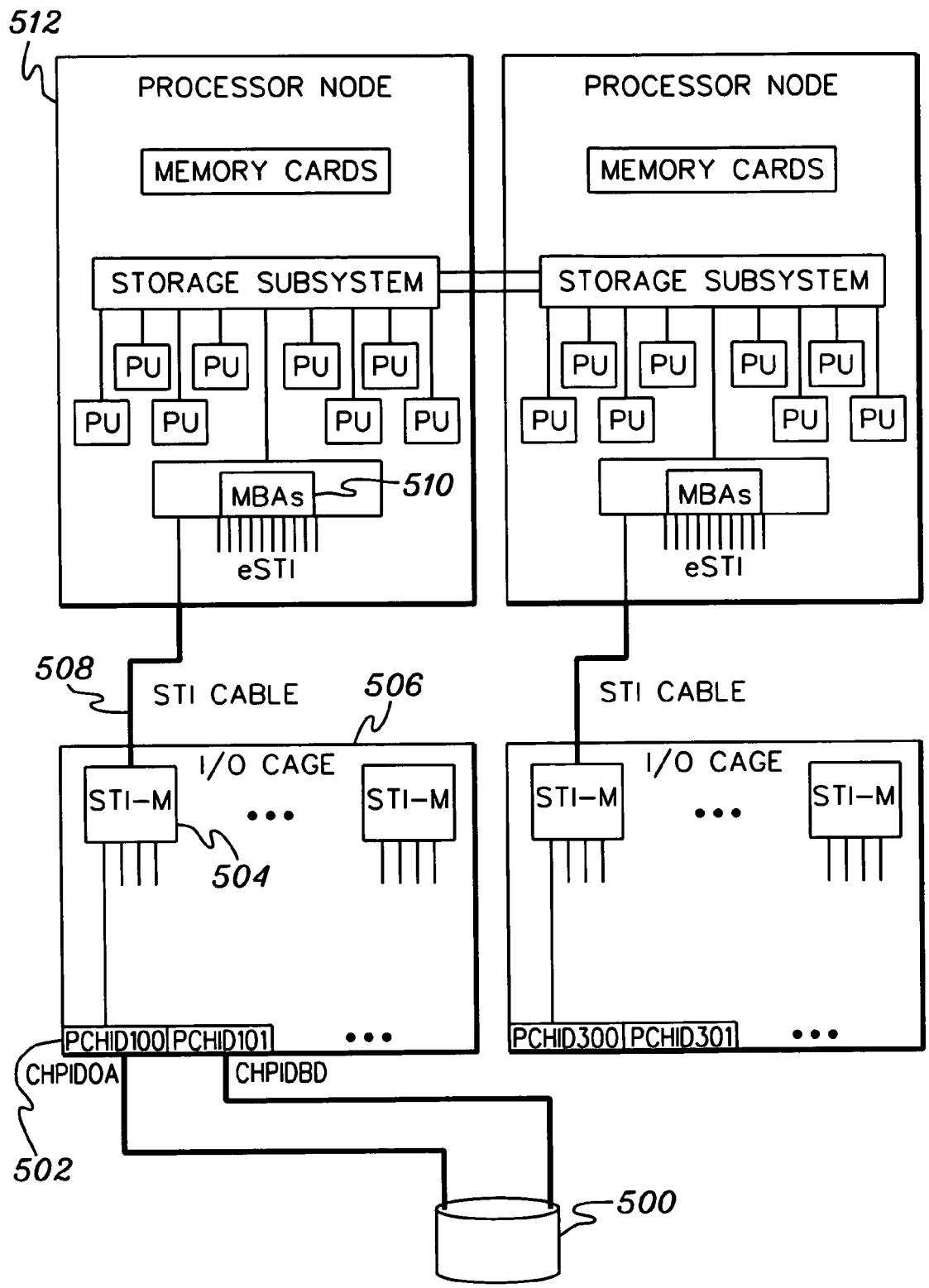
FIG. 5 depicts one example of a configuration in which failure of a resource causes total loss of data on a particular device.

Referring now to FIG. 4, one embodiment of the availability mapping is described. The availability logic takes into account the physical structure of the processor being configured. For instance, in the case of a z990 machine, this includes processor nodes, memory bus adapters (MBAs) within the nodes, Self Timed Interface (STI) connectors and cables, support cards in the I/O cage, the I/O cage itself, and the I/O cards. All of these components can be single points of failure (SPOF) and/or single points of repair (SPOR). For instance, as shown in FIG. 5, a device 500, such as a storage device, is defined with two CHPIDs, '0A' and 'BD'. Those CHPIDs are assigned PCHIDs 100 and 101, which are on the same physical I/O card 502. This illustrates the poorest availability configuration. A failure of the I/O card, support card 504 (i.e., STI-M), I/O cage 506, STI cable 508, MBA 510, or processor node 512 will cause total loss of the data on device 500.

Figure 6:
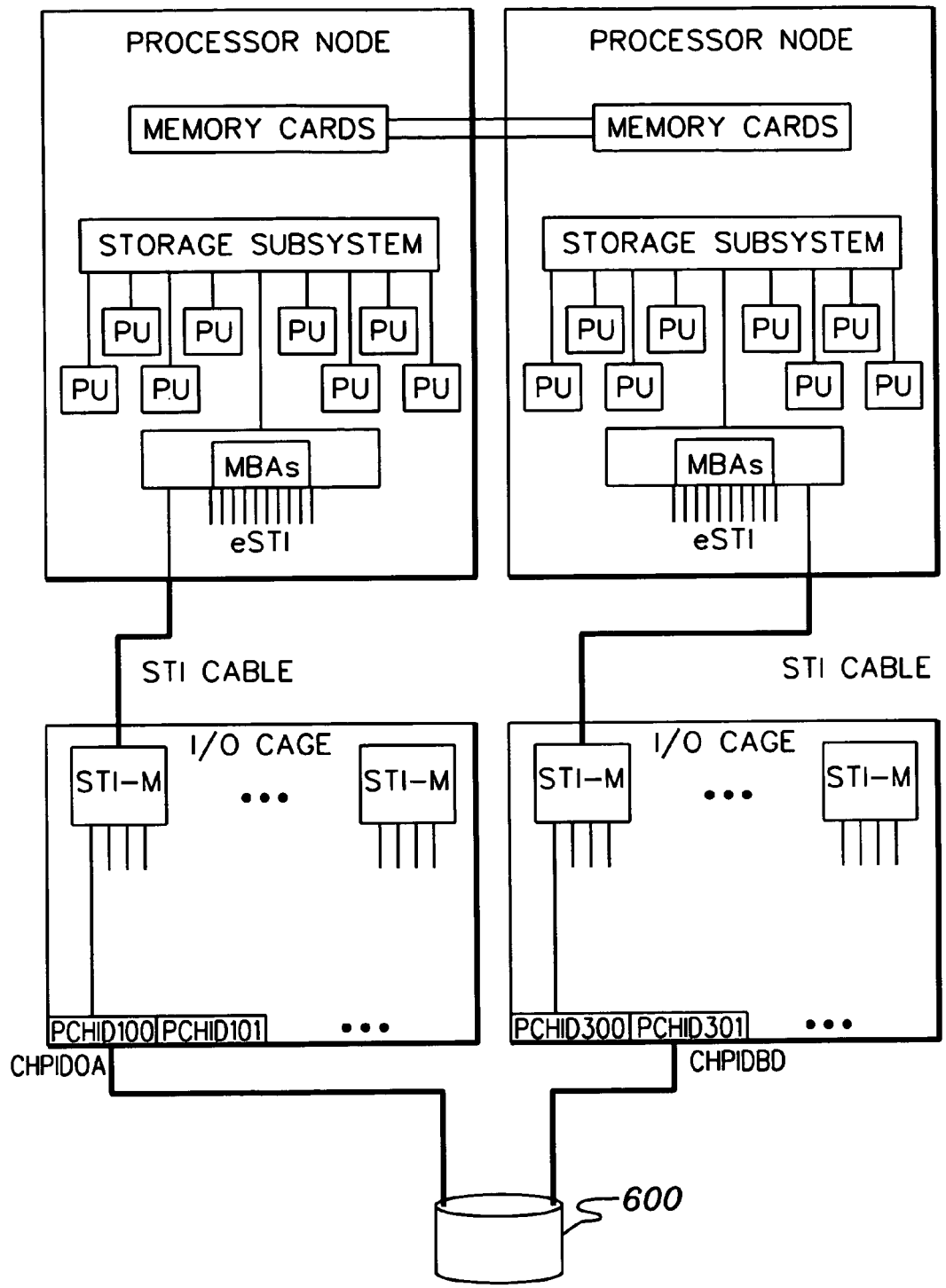
FIG. 6 depicts one example of a configuration in which failure of a resource does not cause total loss of data on a particular device, in accordance with an aspect of the present invention.

Contrast the configuration of FIG. 5 with the configuration of FIG. 6. In FIG. 6, a device 600 using CHPIDs '0A' and 'BD' is assigned to PCHID 100 and PCHID 301. Now a failure in any of the previously named components will leave one of those CHPIDs still functioning. So, no SPOF or SPOR will cause total loss of the data on device 600. This type of configuration is what the availability logic attempts to accomplish when assigning PCHIDs to CHPIDs. That is, the availability logic searches for available channel ports for a given control unit that are dispersed across several SPOF and SPOR, and finds the best balance of those physical channel ports to assign to a given logical CHPID.

Referring to FIG. 4, initially, the CFReport/hardware configuration file and/or session file are loaded, STEP 400. The CFReport or hardware configuration file includes the information in FIGS. 5 and 6, except for information relating to the CHPID and device (control unit). Additionally, the IOCP statements generated from the semi-production IODF are loaded, STEP 402. The IOCP statements include the information relating to the CHPID and device (control unit). Validation is then performed, STEP 404. Examples of validation include, for instance, checking if there are enough physical channels to support the defined CHPIDs; ensuring that logical definitions with existing PCHIDs can be accommodated by the proposed machine, either new or updated; retrieving the PCHID assignment values from the CHPID statements; checking whether there is more hardware on order than required by the logical definition—report to user; checking if some of the PCHIDs support more than one physical channel type—prompt user to resolve; and retrieving priorities stored in IOCP comments and apply to control units. If during validation, an error is determined, INQUIRY 406, then the logical definition may be modified, STEP 408, in which case processing continues with STEP 402, and/or the order may be modified, STEP 410, in which case processing continues with STEP 400.

On the other hand, if validation is successful, then a list of one or more control units is displayed on an availability panel, STEP 412. The list of control units is selected from the input IOCP statements. The user may then assign priorities to the control units, STEP 414, which are used in the mapping logic, as described below. Next, availability processing is selected by the user, STEP 416, and the mapping function is initiated.

As part of the mapping function, the user is prompted to reset previous assignments, if desired, STEP 418. Thereafter, configuring takes place, which includes, for instance, assigning PCHIDs to CHPIDs, STEP 420. For instance, the tool finds the highest priority control unit indicated by the user, interrogates the I/O channel types that attach to that control unit and finds actual physical channels that meet both the logical characteristics of the definition in the IOCP input (e.g., FICON channel types) and that are installed across multiple SPOF and SPOR. The best choice of physically installed channels are then assigned to those logical CHPIDS. The tool then moves to the next priority control unit and repeats the process. This is continued until the logical CHPIDs have physical channels (PCHIDs) assigned to them.

Further details relating to the logic used by the availability mapping to assign PCHIDs to CHPIDs are described below. One objective of the availability logic is to find physical paths to a control unit or group of control units that span single-points-of-failure and single-points-of-repair. In assigning physical paths, it is desirable to preserve the most choices for subsequent control units, and this is accomplished by trying to assign first from those resources with the most available channels.

The points of failure/repair considered in the below logic are:
1. The I/O card. In the case of intersystem channels (ISC), first consider the ISC-M, then the daughter.
2. The domain, single point of failure within a cage. This includes the eSTI-M card and STI cable.
3. The cage.
4. The MBA.
5. The Node.

With the following logic, physical channels (i.e., PCHIDs) are assigned to CHPIDs defined on the input IOCP statements, and the assignment is performed on a channel type basis. In the following, the clause "a path is assigned" indicates that the CHPID statement for one of the paths defined to the control unit has a PCHID keyword and value (for the physical location) added. The logic is repeated for each control unit or set of control units, if the set has been given the same priority.

Availability Rule
Repeat for all Control Units ordered by their priority value
If this control unit or priority group contains mixed channel types (e.g., ESCON & FICON or ICB's and ISC's), determine the number of cards with available ports (e.g., physical channels) of each type.
Group the CHPIDs of same channel type
Order the groups with fewest number of available cards first
Using the type with the fewest number of available cards first, follow the following logic. When assignment is complete for that type return here and go to the next type with the fewest available cards.
Repeat for all CHPID groups
Build the list of domains with ports available for channel type
If number of CHPIDs are less than or equal to number of domains, assign PCHIDs using "Use all domains" step.
If number of CHPIDs are more than number of domains, assign PCHIDs to first "number of domain" CHPIDs using "Use all domains" step, remaining CHPIDs should be assigned using "Used all domains" step.
Use all domains
Search each domain in the configuration for the desired channel type and collect the following information
Number of unused ports in the domain.
Number of cards, with available ports, in the domain.
The cage where this domain is located.
The MBA that is driving this domain.
The node that is hosting that MBA.
Sort the domain list with most available ports first. In the case of a tie, order the domains with most cards first. If still a tie, order the lowest number cage first. If this is the second iteration of the logic for a mixed-type (e.g., ESCON and FICON) control unit, order those domains unused (or least used) by the prior iteration higher regardless of the number of ports in the domain.

As a domain is used in the following steps, remember the number of times it was used and which cards within the domain have been used. Also remember for which channel type the domain was used.

If this is the first iteration of the logic for a given CHPID type and if some of the CHPIDs of this type already have PCHIDs assigned, account for those pre-assigned PCHIDs. For each PCHID already assigned, search the domain list for the domain owning that PCHID. If found, remove the owning domain, and remember the cage, node, node.MBA, and card for previously assigned PCHIDs just as if the logic had done the assignment. Continue with the following steps using the abbreviated domain list.

Divide the number of paths needed by the number of domains in the list. If there's a quotient (other than zero), assign one port from each domain to the CHPIDs on this control unit(s). If a domain contains more than one card, use the card with the most available ports. Continue the logic with the "Used all domains" step. If quotient was zero, continue with next step.

Assign a PCHID from each domain. If number of CHPIDs are less than available domains, balance CHPIDs across cages, nodes and MIBAs. First find the unique cage, node and MBA combination, then node and MBA, and last unique MBA.

While performing the following assignments of paths to ports, keep a memory of the cages, nodes, and node.MBAs that have been used. This can be accomplished by keeping bit masks for cages available, nodes available, and node.MBAs available. "Available" means those components are in the current list of domains that contains the correct type of card.

Assign the firsts path to the card with the most ports available in the top domain on the list and remove this domain from the list. The cage, node, and node.MBA memory (bits) are removed from being available.

As long as there are paths remaining, repeat the following steps:

Search the list from the top for first domain with a unique cage, node and MBA from those previously used. If found, assign a path to the card with most available ports and remove this domain from the list. The cage, node, and node.MBA memory (bits) are also removed from being available. Otherwise, Search the list from the top for first domain with a unique node and MBA from those previously used. If found, assign the path to the card with the most ports and remove this domain from the list. The node.MBA memory (bits) are also removed from being available. Otherwise, Search the list from the top for the first domain with a unique MBA (i.e., node.MBA) from those previously used. If found, assign the path to the card with the most ports and remove this domain from the list. The node.MBA memory (bits) are also removed from being available.

As these searches and assignments progress, and all the available cages in the list have been used once, reset the memory of cages used. Likewise, once all available nodes in the list have been used once, reset the memory of the nodes used. Only those cages and nodes that have an unassigned channel of the correct type should be considered "available".

This process concludes when all available node.MBAs have been used or all the needed paths have been assigned to physical ports.

When the above is complete, either all the paths have been assigned, or each unique node.MBA should have been used once. If there are still more paths to assign and there are domains remaining in the list (means the same node.MBA has been used more than once in plugging domains), reset the cage, node used, and node.MBA memory and resume at the "Balance CHPIDs across cages, nodes and MBAs" step.

Used all domains

Rebuild the domain list with cards which have not been used yet (e.g., multiple cards of the correct type in a domain). Sort the list so the domain with the largest number of ports is first. If there are no domains in the list (i.e., a path has been assigned to every card) start at the beginning (use all domains).

Assign a PCHID from each domain, if number of CHPIDs are more than domains, remaining CHPIDs should be assigned using "Used all domains". If number of CHPIDs are less than domains, balance the CHPIDs across cages, nodes and MBAs. First find the unique cage, node and MBA combination, then node and MBA and last unique MBA. If there are still more CHPIDs to be assigned, start at beginning.

Divide the number of paths remaining to be assigned by the number of domains in the list. If there is a quotient (other than zero), assign one path to the unused card with the most available ports in each domain. If more paths need to be assigned, resume at the "Used All Domains" step. Otherwise quotient was zero and continue at the next step.

While performing the following assignments of paths to ports, keep a memory of the cages, nodes, and node.MBAs that have been used. This can be accomplished by keeping bit masks for cages available, nodes available, and node.MBAs available. "Available" means those components are in the list of domains that contains the correct type of card.

Assign the first path to the unused card with the most ports available in the top domain on the list and remove this domain from the list. Remember the case, node, and MBA from this domain. The cage, node, and node.MBA memory (bits) are removed from being available.

As long as there are paths remaining, repeat the following steps:

Search the list from the top for the first domain with a unique cage, node, and MBA from those previously used. If found, assign path to the unused card with most available ports and remove this domain from the list. The cage, node, and node.MBA memory (bits) are also removed from being available. Otherwise, Search the list from the top for the first domain with a unique node and MBA from those previously used. If found, assign the path to the unused card with the most ports and remove this domain from the list. The node and node.MBA memory (bits) are also removed from being available. Otherwise, Search the list from the top for the first domain with a unique MBA (i.e., node.MBA) from those previously used. If found, assign the path to the unused card with the most ports and remove this domain from the list. The node.MBA memory (bits) are also removed from being available.

As these searches and assignments progress, once the available cages in the configuration have been used, reset the memory of cages used. Likewise, once available nodes have been used once, rest the memory of nodes used. Only those cages and nodes that have an unassigned channel of the correct type should be considered "available".

When the above is complete, either all the paths have been assigned, or each available card should have been used exactly once. If there are still more paths to assign, resume at the beginning ("Using all domains"), after clearing all memory of nodes, cages, and cards used. Do not clear the channel type memory.

Next Group

Next Control Unit

Once a given physical channel is assigned to a logical CHPID, that assignment is fixed (until changed). If the same logical CHPID is used in a lower priority control unit, the logic finds physical channels that complement the previously assigned physical channel to assign to new logical CHPIDs. This happens often in a configuration as a given physical channel can and should be used to access various data (i.e., control units). Thus, the logic is versatile enough to recognize that, for instance, two of the logical CHPIDs in the current control unit have been previously assigned to physical channels, but two new logical CHPIDs are defined for the control unit. Given this situation, the logic finds two new physical channels that are on different SPOF and SPOR than the previously assigned CHPIDs.

When the tool cannot find an ideal balance of physical channel ports for a given control unit, it indicates that some of the physical channels do, indeed, have some SPOF or SPOR. These indications show where there are potential SPOF or SPOR. For instance, if two logical CHPIDs had to be assigned on the same channel card, a "C" will be indicated next to those two CHPID numbers. Similar indications are provided for other SPOF/SPOR. For instance, a "S" is indicated, if the channels to a control unit share the same STI; or a "N" is indicated in a multi-node configuration where all the channels are from the same node. The user can then review its total control unit configuration, see where some interfaces have SPOF or SPOR, and choose to either accept the configuration, re-prioritize the data, or possibly change the configuration by ordering additional channels, nodes, or cages to achieve the level of availability desired by the enterprise.

When the user is satisfied with the physical channel (PCHID) assignments to logical CHPIDs, output can be generated, STEP 422 (FIG. 4). The main output is updated IOCP statements that include PCHID assignments for the logical CHPID definitions. The output also includes, in one example, some special IOCP comment statements that recall the priorities assigned to the control units in the definition. These comment statements are recalled, if the same IOCP input is used on a subsequent initiation of the tool. This allows previous work by the user to be preserved and only new priorities need be inputted to the tool. HCD provides a special repository for these comments, so if a subsequent export of IOCP input statements is requested from a semi-production IODF the comments will be regenerated for use by the tool.

For native IOCP users, the updated input statements are ready to be used to configure the machine when it is installed. For HCD users, the updated statements can be imported into the IODF that generated the original input to the tool. The updated IODF can now be made into a full production IODF and used to configure a new machine or reconfigure an already configured machine.

Further output from the tool includes, for instance, reports that will help the customer and support staff in understanding the logical CHPID assignments made for physical channels, STEP 424. For instance, a CHPID report indicates the physical channels PCHIDs and associated logical CHPIDs arranged by node and MBA. Physical channels belonging to a same card slot are reported together. There is tabular depiction of physical channel placements which can be used by support personnel at the time of cabling. A Control Unit report lists the priorities assigned by the user to each of the control units by, for instance, logical channel subsystem and intersects found, if availability mapping has been performed. A port report simply lists the cages, and physical locations in a sorted fashion along with the logical definitions (CHPIDs) associated with that location. Other reports include, for instance, a Fiber Quick Connect (FQC) report and a Fiber Cable Worksheet.

Figure 7:
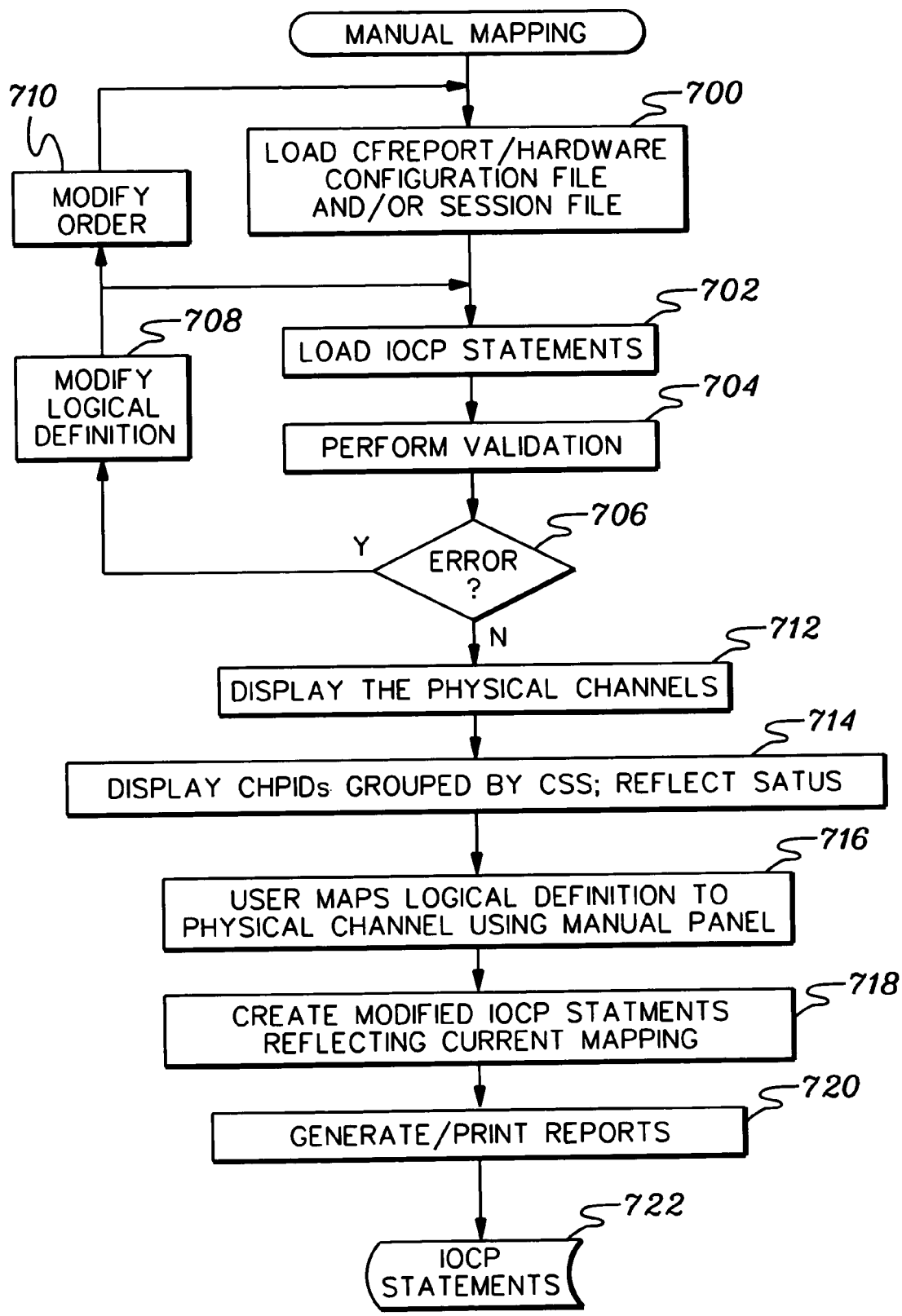
FIG. 7 depicts one embodiment of the logic associated with manual mapping offered with the mapping tool, in accordance with an aspect of the present invention.

As described above, in addition to availability mapping, manual mapping may be used. In one example, the user may switch between availability mapping and manual mapping and back again. One embodiment of the logic associated with manual mapping is described with reference to FIG. 7.

In one example, the CFReport/hardware configuration file and/or session file are loaded, STEP 700. Additionally, the IOCP statements generated from the semi-production IODF are loaded, STEP 702. Validation is then performed, STEP 704. As examples, this validation includes checking if there are enough physical channels to support the defined CHPIDs—if not, flag error; for update or MES orders, checking whether the logical definitions with existing PCHIDs can be accommodated by the proposed machine; checking whether there is more hardware on order than required by the logical definition—if so, report to user; and checking whether one or more of the CHPIDs support more than one physical channel—prompt user to resolve. If an error is encountered during validation, INQUIRY 706, then the logical definition may be modified, STEP 708, and processing continues with STEP 702, and/or the order may be modified, STEP 710, in which case processing continues with STEP 700.

Returning to INQUIRY 706, if the validation is successful, then the physical channels are displayed, STEP 712. In one example, the physical channels are displayed on a panel with the PCHID values. Additionally, the CHPIDs are displayed, STEP 714. In one example, when a physical channel is selected, the display shows only the logical CHPID definitions that match the physical channel types that are available to be assigned to the PCHID. In the example in which an environment is being configured that includes multiple channel subsystems (CSSs), the CHPIDs are grouped by CSS. In one example, a color scheme is used to reflect status.

Next, the user maps the logical definition to physical channel using a manual panel, STEP 716. Further, the tool creates the IOCP statements reflecting the current mapping, STEP 718. Subsequently, the tool generates or prints reports, STEP 720. The output of the manual mapping is, for instance, IOCP statements 722.

Figure 8A:
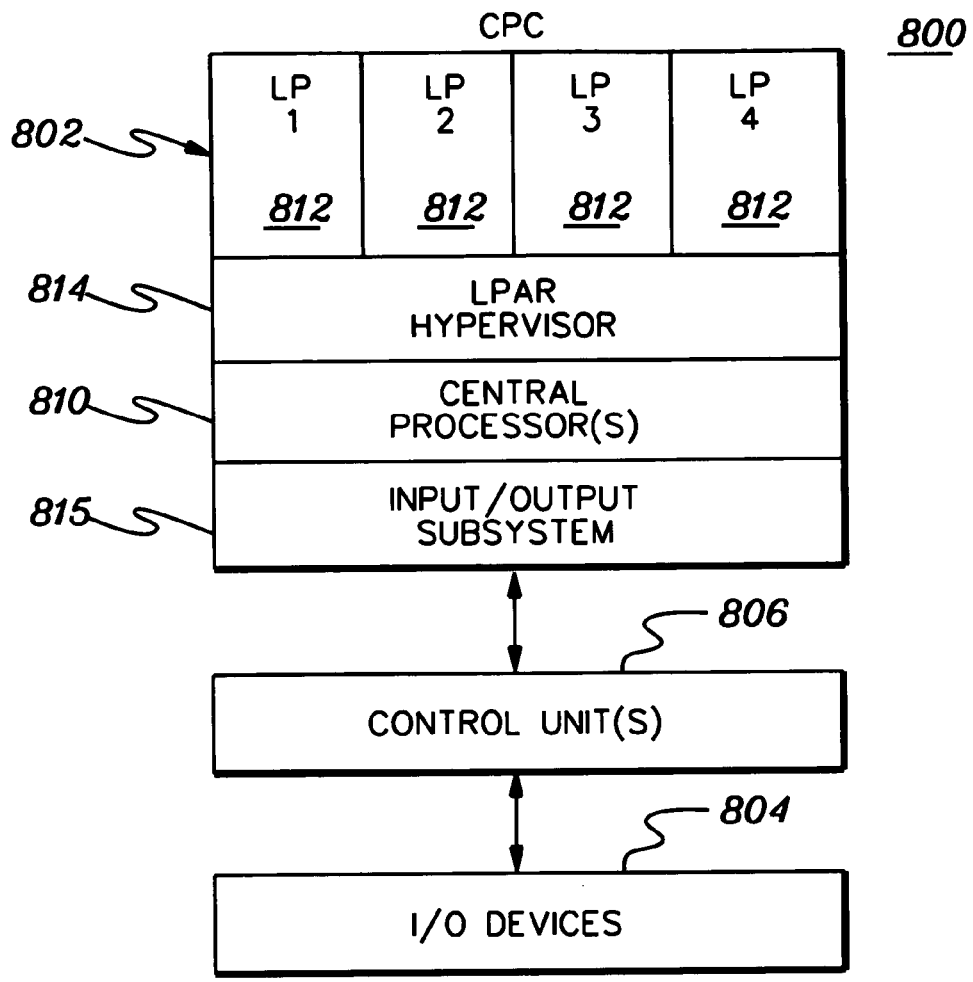
FIGS. 8a-8c depict one embodiment of communications environment configured using one or more aspects of the present invention.
Figure 8B:
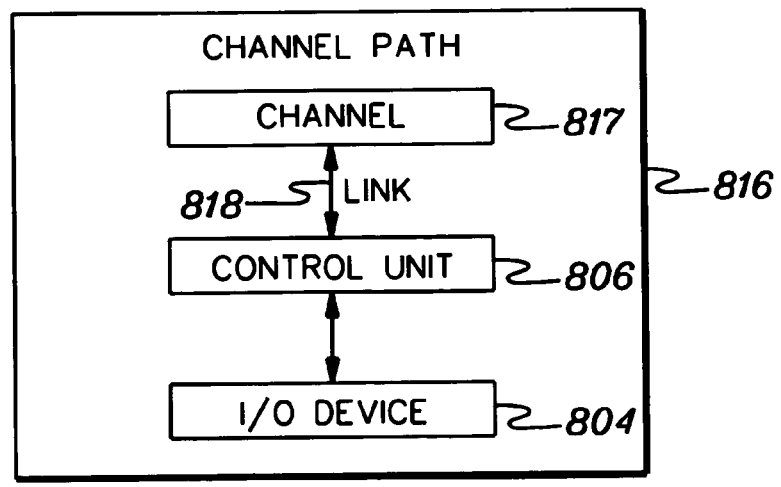
Figure 8C:
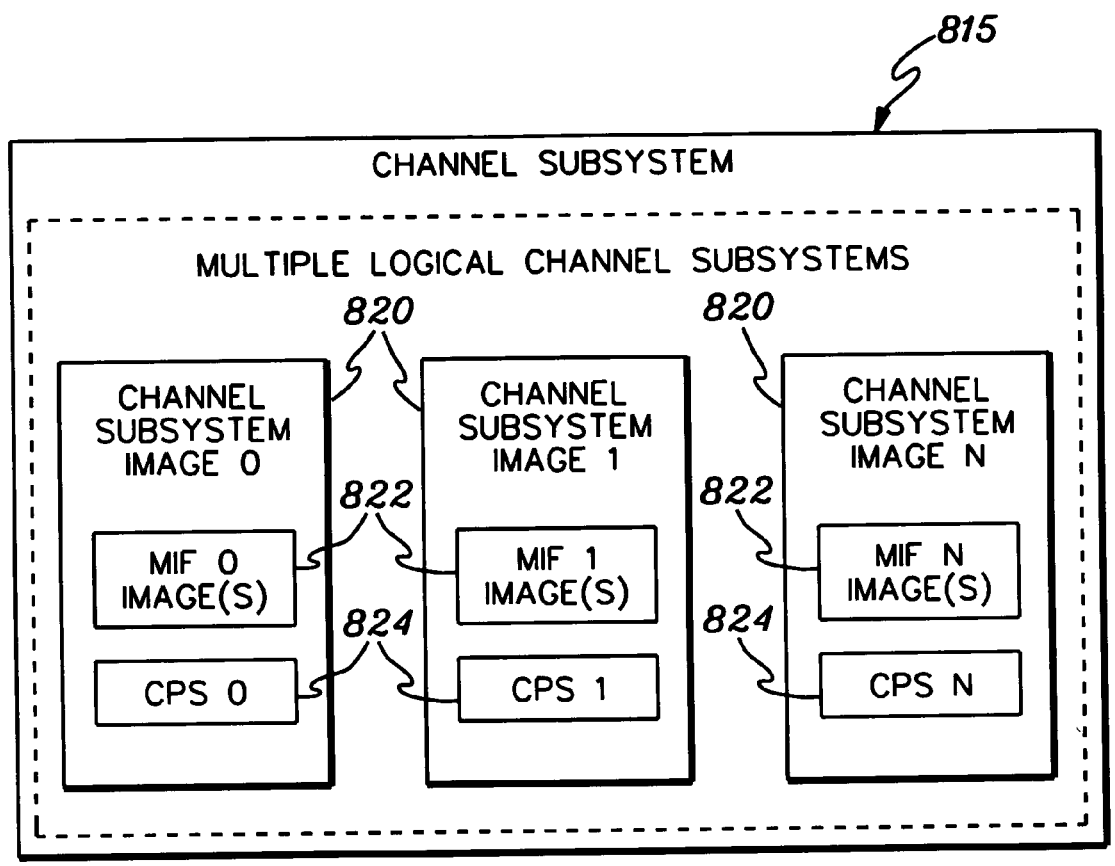

One example of a communications environment to be configured by one or more aspects of the present invention is depicted in FIGS. 8a-8c. In one example, communications environment 800 is based on the z/Architecture and includes the multiple channel subsystem (MCSS) facility, offered by International Business Machines Corporation, Armonk, N.Y. The z/Architecture is described in an IBM publication entitled "z/Architecture Principles of Operation," Publication Number SA22-7832-01, October 2001, and MCSS is described in U.S. patent application "Multiple Logical Input/Output Subsystem Facility," Brice et al., Ser. No. 10/436,021, filed May 12, 2003, each of which is hereby incorporated herein by reference in its entirety.

As one example, communications environment 800 includes a central processor complex (CPC) 802 coupled to one or more input/output (I/O) devices 804 via one more control units 806. Central processor complex 802 includes, for instance, one or more central processors 810, one or more partitions 812 (e.g., logical partitions (LP)), a logical partition hypervisor 814, and an input/output subsystem 815, each of which is described below.

Central processors 810 are physical processor resources allocated to the logical partition. In particular, each logical partition 812 has one or more logical processors, each of which represents all or a share of a physical processor 810 allocated to the partition. The logical processors of a particular partition may be either dedicated to the partition, so that the underlying processor resource 810 is reserved for that partition; or shared with another partition, so that the underlying processor resource is potentially available to another partition.

A logical partition functions as a separate system and has one or more applications and a resident operating system therein, which may differ for each logical partition. In one embodiment, the operating system is the z/OS operating system, the z/VM operating system, the z/LINUX operating system or the TPF operating system offered by International Business Machines Corporation, Armonk, N.Y.

Logical partitions 812 are managed by a logical partition hypervisor 814, which is implemented by licensed internal code running on processors 810. The logical partitions and logical partition hypervisor each comprise one or more programs residing in respective partitions of central storage associated with the central processors. One example of logical partition hypervisor 814 is the Processor Resource/System Manager (PR/SM), offered by International Business Machines Corporation, Armonk, N.Y. Further details regarding logical partitions are described in, for instance, Guyette et al., U.S. Pat. No. 4,564,903, entitled "Partition Multiprocessor Programming System," issued on Jan. 14, 1986; Bean et al., U.S. Pat. No. 4,843,541, entitled "Logical Resource Partition Of A Data Processing System," issued on Jun. 27, 1989; and Kubala, U.S. Pat. No. 5,564,040, entitled "Method And Apparatus For Providing A Server Function In A Logically Partitioned Hardware Machine," issued on Oct. 8, 1996, each of which is hereby incorporated herein by reference in its entirety.

Input/output subsystem 815 directs the flow of information between input/output devices 804 and main storage. It is coupled to the central processing complex, in that it could be part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters, including, for instance, channels, I/O adapters, PCI cards, Ethernet cards, Small Computer Storage Interface (SCSI) cards, etc. In the particular example described herein, the I/O communications adapters are channels (e.g., ESCON or FICON channels), therefore, the I/O subsystem is referred to herein as a channel subsystem. However, this is only one example.

The I/O subsystem uses one or more input/output paths as communication links in managing the flow of information to or from input/output devices 804. In this particular example, these paths are called channel paths, since the communications adapters are channels. Each channel path 816 (FIG. 8b) includes a channel 817 of channel subsystem 815, a control unit 806, a link 818 (e.g., serial or parallel) between the channel and control unit, and one or more I/O devices 804 coupled to the control unit. In other embodiments, channel paths may have multiple control units and/or other components. Further, in another example, it is also possible to have one or more dynamic switches as part of the channel path. A dynamic switch is coupled to a channel and a control unit and provides the capability of physically interconnecting any two links that are attached to the switch. Further details regarding channel subsystems are described in Capser et al., U.S. Pat. No. 5,526,484, entitled "Method And System For Pipelining The Processing Of Channel Command Words," issued on Jun. 11, 1996, which is hereby incorporated herein by reference in its entirety.

A control unit may be accessible by the channel subsystem by more than one channel path. Similarly, an I/O device may be accessible by the channel subsystem through more than one control unit, each having one or more channel paths to the channel subsystem. The control unit accepts control signals from the channel subsystem, controls the timing of data transfer over the channel path, and provides indications concerning the status of the device. The control unit may be housed separately or it may be physically and logically integrated with the I/O device, the channel subsystem, or a central processor.

The I/O device attached to the control unit may be designed to perform certain limited operations or it may perform many different operations. To accomplish its operations, the device uses detailed signal sequences peculiar to its type of device. The control unit decodes the commands received from the channel subsystem, interprets them for the particular type of device, and provides the signal sequence required for the performance of the operation.

In addition to one or more channels, a channel subsystem includes one or more subchannels. Each subchannel is provided for and dedicated to an I/O device, or group of I/O devices, coupled to the program through the channel subsystem. Each subchannel provides information concerning the associated I/O device, or group of I/O devices, and its attachment to the channel subsystem. The subchannel also provides information concerning I/O operations and functions involving the associated I/O device, or group of I/O devices. The subchannel provides a logical appearance of a device or a group of devices to the program and is the means by which the channel subsystem provides information about associated I/O devices to the central processors, which obtain this information by executing I/O instructions.

Further details regarding a channel subsystem are described with reference to FIG. 8c. In one example, channel subsystem 815 (or other I/O subsystem) is configured as a plurality of channel subsystem images 820 (or other I/O subsystem images) each identified by a channel subsystem image identifier (CSSID) (or other I/O subsystem identifier). In one example, the channel subsystem is configured, either by model-dependent means, in which configuration controls are used during initialization, or by use of appropriate dynamic I/O configuration commands, as 1 to 256 channel subsystem images (MCSS). Each channel subsystem image appears to the program as a complete channel subsystem. Each channel subsystem image may have from 1 to 256 unique channel paths, thereby increasing the maximum number of channel paths that may be configured to the channel subsystem from 256 to 65,536.

A channel subsystem image 820 includes, for instance, a multiple image facility (MIF) 822, which includes one or more (e.g., up to 16) MIF images, each identified by a MIF image identifier (IID). The multiple image facility allows each logical partition to achieve independent access to the channel paths, control units or I/O devices that are configured to and dynamically shared by multiple logical partitions. Various details regarding the multiple image facility are described in Brice, Jr. et al., U.S. Pat. No. 5,414,851, entitled "Method And Means For Sharing I/O Resources By A Plurality Of Operating Systems," issued on May 9, 1995, which is hereby incorporated herein by reference in its entirety.

In addition to a MIF, a channel subsystem image 820 also includes a channel path set (CPS) 824. Channel path set 824 includes, for instance, 1 to 256 channel paths configured to one or more channel path images in the associated MIF. Each channel path is identified by a channel path identifier (CHPID). Each channel path configured to a channel path set may be unique from other channel paths configured to other provided channel subsystem images. However, because as many as 256 channel subsystem images may be provided, the CHPID values assigned to channel paths in each of the channel path sets may not be unique. Therefore, each channel path is specified by a unique address formed by, for instance, a concatenation of CSSID with the channel path identifier assigned to the channel path. The image id further identifies a channel path image for each configured channel path.

Described in detail above is a capability for configuring communications environments. In one example, this capability includes a tool for mapping PCHIDs to CHPIDs. The tool aids a customer in assigning logical CHPID numbers to physical channels and to configure control units, so that data is not on a single point of failure or single point of repair. As one example, the tool is a workstation based application that uses data generated from a customer order and the customer's logical configuration definition, and generates as output the physical configuration definition and one or more reports. The reports help an owner of a configuration and support staff in understanding the logical CHPID assignments made for physical channels.

As examples, the tool provides two functions: manual mapping and availability mapping. With manual mapping, the user is presented with a screen showing the physical channels in the ordered machine and the logical definitions already made. The user can then connect/associate the two, thus associating the physical channel with the logical definition. With availability mapping, the user can prioritize the importance of specific logical channels and then receive an automatic logical to physical channel mapping, which minimizes any single point of failure or single point of repair within the environment. That is, automatic linkage of a logical definition of a channel to a physical channel, which is selected that best exploits the reliability, availability and serviceability of an environment. The linkage process is facilitated based on reports of both the logical and physical channels.

Advantageously, in one example, the output of the tool (e.g., the IOCP statements with PCHIDs) is fed back into HCD, and thus, it is under customer control. It seeds the machine with relationships between the CHPID and physical location each time the machine is powered on with a different IOCDS. Therefore, the CHPID assignments are not "permanent," since there is not, for instance, a diskette with the output being fed directly into the machine at the time of installation, but instead can be changed by the user.

The tool stores information in the IOCP file, so when a user comes back to the tool for the same processor, the user does not have to redo the work. It remembers over the life of the configuration prior work performed using the tool.

Although the mapping tool is described with reference to mapping logical channel identifiers to physical channels, one or more aspects of the present invention can be used to configure other resources of the communications environment. Therefore, aspects of the present invention, as well as the mapping tool, are not limited to channels (or even other communications adapters).

Advantageously, the mapping logic is able to be used with many types of environments, including, for instance, those environments that support the multiple channel subsystem facility and several hundred or thousands of I/O channels. However, environments other than that described herein may be configured using one or more aspects of the present invention. As one example, user unit 102 and communications unit 106 may be one and the same unit. Other examples also exist. As a further example, an environment need not include the multiple channel subsystem facility. Many other types of environments may use the mapping logic described herein. As yet a further example, a hardware configuration definition need not be used to produce the IOCP statements. The IOCP statements may be generated by the user directly.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating configuring of resources of a communications environment, said method comprising:

automatically mapping, by a configuration unit, a first identifier of a resource of a machine being configured to a second identifier of the resource to assign a physical path of the resource to a logical path of the resource, wherein the first identifier is usable by hardware to identify the resource and the second identifier is usable by a program of the machine to identify the resource, and wherein the mapping is based on the physical structure of the machine being configured and on avoiding single points of failure or single points of repair; and choosing the second identifier for which mapping is to occur from a plurality of second identifiers, said choosing being based on a priority associated with another resource coupled to the resource of the machine being configured.

2. The method of claim 1, wherein the resource comprises a channel, the first identifier comprises a physical channel identifier (PCHID) and the second identifier comprises a logical channel path identifier (CHPID).

3. The method of claim 1, wherein the resource comprises a communications adapter, the communications adapter is of an input/output subsystem of the machine, the input/output subsystem being configured as a plurality of input/output images.

4. The method of claim 1, wherein the automatically mapping comprises automatically selecting the first identifier to be mapped to the second identifier from a plurality of first identifiers, wherein the selecting takes into consideration a definition associated with the second identifier.

5. The method of claim 4, wherein the selecting takes into consideration the availability of a plurality of resources associated with the plurality of first identifiers in selecting the first identifier to be mapped to the second identifier.

6. The method of claim 1, further comprising providing as input to the automatically mapping a physical description of one or more resources of the machine, said physical description comprising the first identifier.

7. The method of claim 6, wherein the physical description is in a report generated in response to ordering the machine, said report being a direct input to the automatically mapping.

8. The method of claim 6, further comprising providing as another input to the automatically mapping a logical definition of the resource, said logical definition comprising the second identifier.

9. The method of claim 1, wherein an output of the automatically mapping is an input/output control program statement that includes the first identifier, and wherein the method further comprises providing the input/output control program statement to a hardware configuration definition to be used to produce an input/output configuration data set usable by the machine for configuration.

10. The method of claim 9, wherein the second identifier is provided to the automatically mapping via the hardware configuration definition.

11. The method of claim 1, wherein the automatically mapping comprises performing one or more selective validations on data input to the automatically mapping.

12. The method of claim 1, wherein the automatically mapping is performed to change a configured machine.

13. The method of claim 1, wherein the machine being configured is a new machine being built.

14. The method of claim 1, wherein the another resource is a control unit, the resource of the machine being configured is a channel, the first identifier is a physical channel identifier (PCHID) and the second identifier is a logical channel identifier (CHPID), and wherein the automatically mapping comprises first selecting the control unit with the highest priority and for that control unit, mapping a PCHID to a CHPID of a channel associated with the control unit.

15. The method of claim 14, wherein the priority is assigned to the control unit by a user.

16. The method of claim 1, wherein the resource comprises a channel, and wherein the mapping is further based on the type of channel.

17. A computer system for facilitating configuring of resources of a communications environment, the computer system comprising:
a memory; and
a processor in communications with the memory, wherein the computer system is capable of:
automatically mapping a first identifier of a resource of a machine being configured to a second identifier of the resource to assign a physical path of the resource to a logical path of the resource, wherein the first identifier is usable by hardware to identify the resource and the second identifier is usable by a program of the machine to identify the resource, and wherein the mapping is based on the physical structure of the machine being configured and on avoiding single points of failure or single points of repair; and
choosing the second identifier for which mapping is to occur from a plurality of second identifiers, said choosing being based on a priority associated with another resource coupled to the resource of the machine being configured.

18. The computer system of claim 17, wherein the another resource is a control unit, the resource of the machine being configured is a channel, the first identifier is a physical channel identifier (PCHID) and the second identifier is a logical channel identifier (CHPID), and wherein the automatically mapping comprises first selecting the control unit with the highest priority and for that control unit, mapping a PCHID to a CHPID of a channel associated with the control unit.

19. A non-transitory computer readable storage device having instructions for execution by a processor for:
automatically mapping a first identifier of a resource of a machine being configured to a second identifier of the resource to assign a physical path of the resource to a logical path of the resource, wherein the first identifier is usable by hardware to identify the resource and the second identifier is usable by a program of the machine to identify the resource, and wherein the mapping is based on the physical structure of the machine being configured and on avoiding single points of failure or single points of repair; and
choosing the second identifier for which mapping is to occur from a plurality of second identifiers, said choosing being based on a priority associated with another resource coupled to the resource of the machine being configured.

20. The non-transitory computer readable storage device of claim 19, wherein the another resource is a control unit, the resource of the machine being configured is a channel, the first identifier is a physical channel identifier (PCHID) and the second identifier is a logical channel identifier (CHPID), and wherein the automatically mapping comprises first selecting the control unit with the highest priority and for that control unit, mapping a PCHID to a CHPID of a channel associated with the control unit.

* * * * *